June 14, 1960

J. A. KLINE 2,940,560

MOTOR VEHICLE SAFETY SYSTEM

Filed Dec. 9, 1954

INVENTOR.
JAMES A. KLINE

BY Kenyon & Kenyon
ATTORNEYS.

INVENTOR.
JAMES A. KLINE
BY Kenyon & Kenyon
ATTORNEYS.

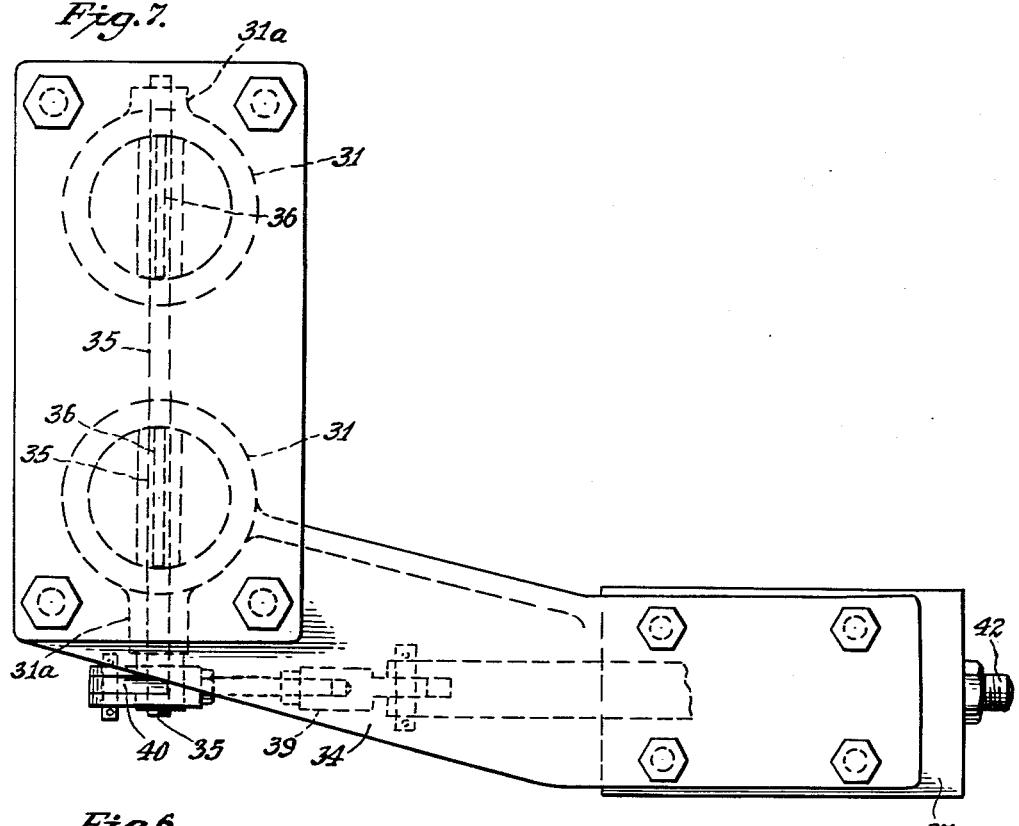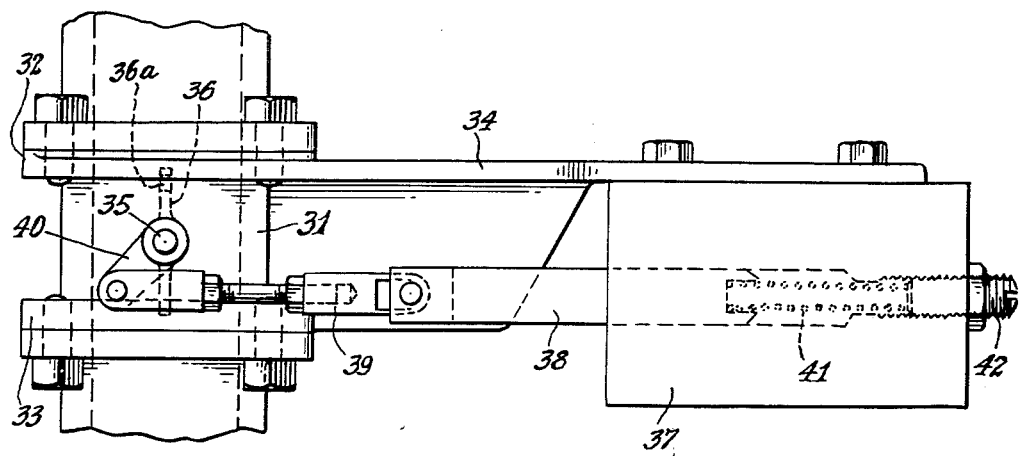

United States Patent Office 2,940,560
Patented June 14, 1960

2,940,560

MOTOR VEHICLE SAFETY SYSTEM

James A. Kline, 1817 Liberty St., Trenton, N.J.

Filed Dec. 9, 1954, Ser. No. 474,219

6 Claims. (Cl. 192—3)

This invention relates to a motor vehicle safety system which may be applied to any motor vehicle but which is particularly intended for application to automobiles.

Current automobiles are equipped with hydraulic brakes which include a master cylinder having a hydraulic liquid reservoir which has adequate capacity but assures safety only in the event it receives regular attention by servicemen. In most automobiles the master cylinder is located where it is not readily accessible and, therefore, servicemen do not customarily make the necessary inspection to determine whether or not the reservoir has an adequate supply of liquid. The operator of the car ordinarily is unaware of the fact that the liquid is always being lost slowly and, of course, quite rapidly in the event of actual leakage in the brake system.

For the above and other reasons it is not uncommon for an automobile operator suddenly to become aware of the fact that the automobile brakes have ceased to be operative. When this occurs unexpectedly at a critical moment an accident results. Furthermore, even after the operator is aware of the trouble his ordinary driving habits combined with forgetfulness may cause him to drive at an unsafe speed, considering the brake condition, on the way to the repair shop which must be visited to correct the trouble.

Automobiles also are equipped with accelerators incorporating a foot pedal located adjacent to the brake foot pedal which operates the brakes. The current use of automatic transmissions leaves only these two pedals on the floor board.

The adjacent location of these two pedals, just described above, introduces the hazard that an inexperienced or excited automobile operator may press on the accelerator foot pedal while also pressing on the brake pedal for the purpose of stopping the automobile in an emergency. This also usually results in an accident.

With the foregoing in mind, one of the objects of the present invention is to provide an automobile safety system which will make is substantially impossible for an automobile operator to remain ignorant of a low supply of hydraulic brake liquid. Another object is to provide such a system in a form protecting the automobile operator from the dangerous condition usually associated with pressing on both the accelerator and brake pedals by mistake when intending to brake the automobile. These and various other objects will be made more apparent by the following disclosure.

A specific example of the new automobile safety system is illustrated by the accompanying drawings in which:

Fig. 1 schematically shows the system with respect to the mechanical parts and the hydraulic liquid tubing;

Fig. 6 is an elevation showing a second unit used by the system; and

Fig. 7 is a top view of the unit illustrated by Fig. 6.

Figure 1:
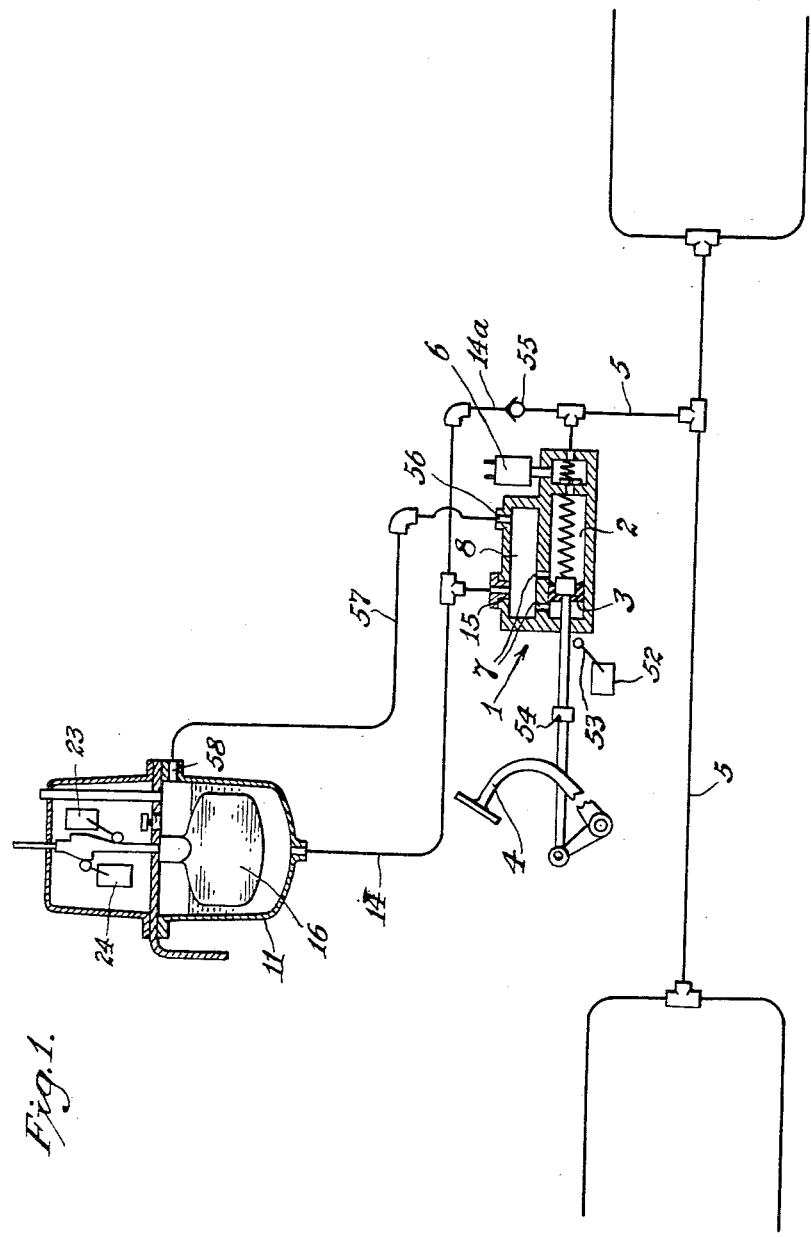

Referring to Fig. 1, the usual automobile hydraulic brake master cylinder 1 includes the cylinder 2 itself in which the piston 3 reciprocates. The end of the cylinder towards which the piston 3 is moved when the usual brake foot pedal 4 is depressed, connects through a tube 5 which, through the various distributing and connecting elements, connects with the brake actuating cylinder at each wheel of the automobile. A pressure actuated switch 6 connects with the hydraulic liquid so as to close when the liquid pressure increases to a predetermined degree, this switch customarily actuating the stop-warning lights of the automobile. At its other end the cylinder 2 has ports 7 which connect with the liquid supply reservoir 8 located above the cylinder 2.

The above description applies to the conventional arrangement used by practically all automobiles. The automobile manufacturer has the idea that the operator will periodically inspect the reservoir 8 so as to maintain it at a proper level as required for safe brake operation. This often does not occur because the master brake cylinder unit is located at such an inconvenient place which causes servicemen to overlook this chore. Frequently the automobile operator does not even know that the reservoir should be insepected regularly and maintained full of liquid.

Figure 3:
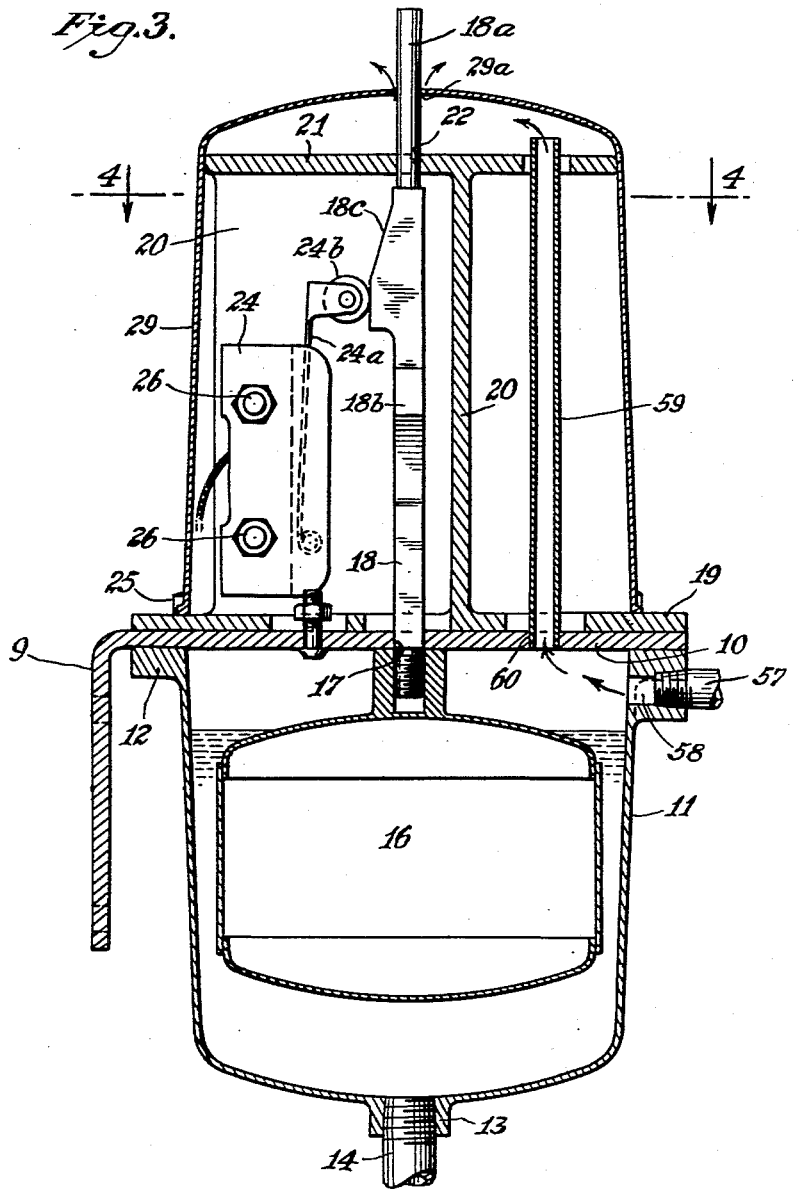
Fig. 3 is a vertical section of a first unit used by the system.
Figure 4:
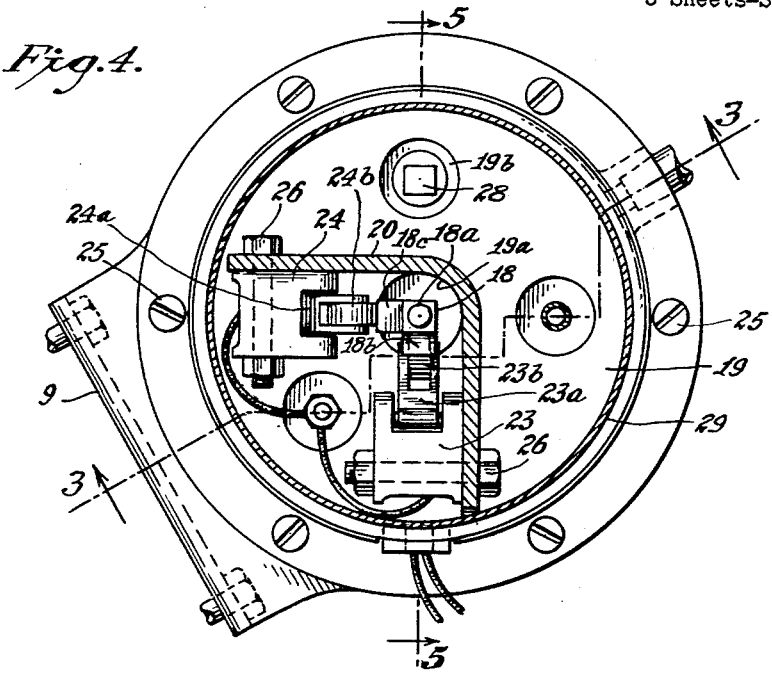
Fig. 4 is a cross section taken on the line 4—4 in Fig. 3.
Figure 5:
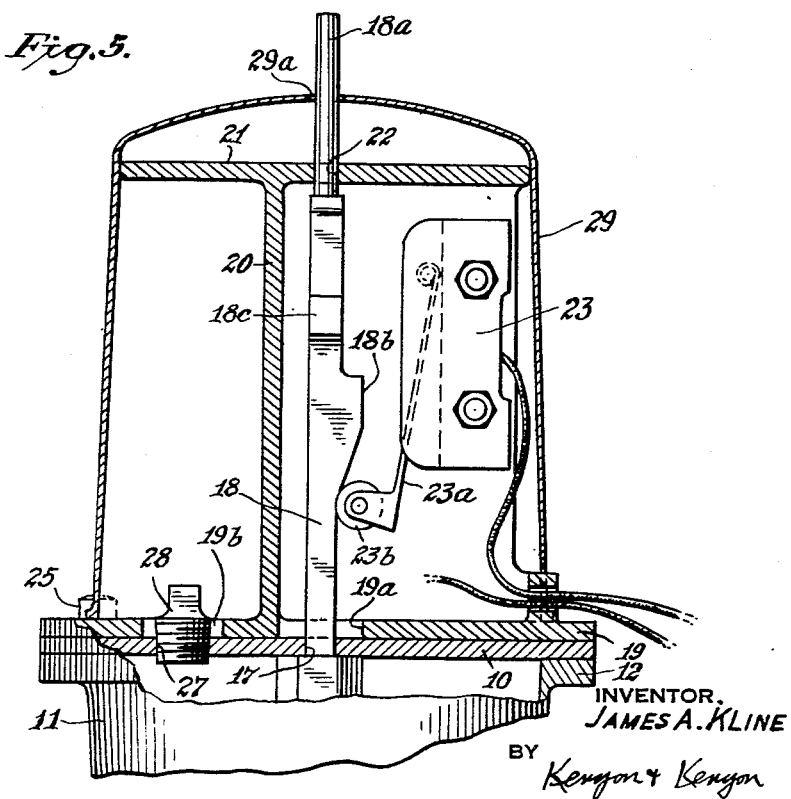
Fig. 5 is a vertical section of the upper portion of this first unit taken on the line 5—5 in Fig. 4.

In accordance with the present invention the unit shown by Figs. 3 through 5, in detail, is mounted at a location where it is easily accessible to servicemen and the automobile operator. This location may be on the side of the automobile fire wall which is towards the motor so that when the hood is opened to make the usual inspections with respect to the motor oil supply and the like, the unit is conspicuously apparent. The idea is to make the unit so conveniently available that its inspection and servicing becomes a regular procedure along with the other routine inspection and servicing procedures.

This novel unit comprises a bracket 9, for facilitating the described installation. This bracket forming a horizontal shelf 10 is adapted for easy installation as described above. A relatively large bowl or container 11 has an open top provided with the peripheral flange 12 which is secured to the bottom of this shelf 10. This bowl 11 may be made from metal suitable for use to form a container or reserve supply source of the hydraulic liquid, but preferably the bowl is made from a transparent plastic having suitable physical properties. The plastic used must, of course, be inert with respect to the hydraulic brake liquid. The size of the bowl 11 should be sufficient to hold a substantial quantity of the liquid and is preferably of larger capacity than the conventional master cylinder reservoir 8, although the capacity of the bowl 11 may be less than this reservoir.

This bowl 11 has an outlet 13 in its bottom which, as shown by Fig. 1, is connected by tubing 14 with the usual filling opening 15 of the master cylinder. As the liquid in the reservoir 8 is lost by being supplied to the cylinder 2, the liquid is continuously replenished by the supply in the bowl 11 with a consequent lowering in the level of the liquid in this bowl.

Returning to Figs. 3 through 5, the bowl 11 contains a float 16 which floats in the liquid in this bowl. The bracket shelf 10 has a square hole 17 formed through it and a stem 18, fastened to the top of the float 16, extends upwardly through this hole 17 and projects for a considerable distance above the shelf 10. This stem is preferably made of nylon because of its light weight and because it reduces the sliding friction. The square shape of the hole 17 and stem 18 prevents rotation of the float and stem relative to the shelf 10, and it is apparent that there are other ways of preventing this rotation while permitting the stem to move up and down.

The top of the shelf 10 mounts an electrical switch assembly comprising a frame having a base 19 which is secured to the shelf's top. An angle bar 20 projects upwardly from the base 19 so that the stem 18 extends along the inside corner of this angle bar and the latter's top end supports a horizontal platform 21 having a hole 22 through which the upper end of the stem 18 extends so that this stem is vertically guided in a sliding manner by two vertically interspaced sliding bearings. The upper end of the stem 18 does not need to be square and is shown at 18a as having a cylindrical shape. This end 18a should project upwardly far enough so that by finger pressure it may be pushed downwardly so as to push the float 16 downwardly a substantial distance against the buoyant effect of any liquid which may be in the bowl 11.

The vertical angle bar 20 has a normally open limit switch 23 fastened to one of its sides and a normally closed limit switch 24 fastened to the other of its sides so that the switches are oriented at a right angle with respect to each other. The two switches are arranged so that one is inverted with respect to the other and each has an arm 23a and 24a, respectively, provided with a roller cam follower on its end, 23b and 24b, respectively. Because of the relative vertical orientation of these switches the roller 23b is located at a lower level than the roller 24b. These switches are activated by the stem 18, the latter having a lower activating cam 18b and an upper activating cam 18c. These cams are arranged so that the arm 24a is swung inwardly, to activate or open the switch 24, when the float 16 is at its uppermost position, and so that as this float falls the arm 24a is released so as to deactivate the switch 24 and permit it to close. The roller 23a is located so that as the float 16 falls to a lower predetermined level the cam 18b activates the switch 23 so as to close this switch. These switch actions occur whenever the stem 18 moves downwardly either because of a falling liquid level in the bowl 11 or because the stem's end portion 18a is manually depressed. The buoyancy of the float 16 and the weight of the float and the parts it sustains effect this action.

The flange 12 and the base 19 may both be secured to the shelf 10 by a series of common screw-threaded fastenings 25 such as are shown in Fig. 4. The switches 23 and 24 may be mounted to the angle bar 20 by means of screw fastenings 26. The base 19 has a hole 19a which is large enough to clear the cams 18b and 18c. It is apparent that assembly and disassembly of this unit are easy matters.

The shelf 10 is provided with a screw-threaded filling hole 27 closed by an appropriate threaded plug 28, the base 19 having a hole 19b providing the necessary clearance. This hole 27 provides a filling hole for the bowl 11 which is readily available and accessible to the automobile operator and servicemen. The switch assembly and this hole 27 and its plug 28 are protected from physical damage and dirt by a cover 29 having a hole 29a for the passage of the stem portion 18a, this cover 29 fitting snugly down over the entire switch unit. This cover may be of a flexible nature so that it may be fastened to the top of the base 19 by being press-fitted about the platform 21. This cover 29 may be made from any suitable metal but is preferably made from a transparent plastic, having adequate physical strength, so that the action of the cams and switches may be obesrved.

The second of the units is shown by Figs. 6 and 7 as comprising one or more conduit sections 31 having an upper flange 32 and a lower flange 33. These flanges are made to match the standard flanges used to fasten the carburetor to the intake manifold of the various conventional automobiles. These flanges are, of course, standardized although they may differ for different makes of automobiles. Thus this unit is adapted to be interposed directly between the carburetor and the intake manifold of the automobile, the number of conduit sections 31 required and their exact contour depending on whether or not the carburetor is of the single or multiple barrel types and the other details characteristic of the make of automobiles for which the safety system is intended. The illustrated device has two sections. It can be seen that when this second unit is installed the normal operation of the usual carburetor, including the action of an automatic choke for example, is not affected in any way. There is no attachment connected to the usual conventional automobile throttle valve.

Continuing, a bracket 34 extends transversely from the conduit sections 31 and the sections have bearings 31a which journal a throttle valve shaft 35 which extends through each section 31 and operates conventional throttle valves 36 located within the sections. The valves are oriented to work synchronously in the same fashion. An electric solenoid 37 is mounted by the bracket 34, and the armature 38, actuated by the solenoid 37, extends horizontally, it being of the reciprocatory core type, and is connected by an adjustable link 39 with an arm 40 secured to the outer end of the shaft 35. A compression coil spring 41 is arranged within the solenoid so as to push out the armature to bias the throttle valves 36 to their open position. When the solenoid 37 is energized its armature 38 pulls in a direction closing the valves 36.

This second unit, when installed between the carburetor and intake manifold, is adjusted by the use of the screw 42, so that when the solenoid 37 is de-energized the valves 36 are opened approximately fully. When the solenoid is energized the valves close and they are designed to prevent the automobile engine from developing enough power to do much more than move the automobile at a slow pace. For example, the valves may be made so that the automobile cannot be operated in excess of 20 m.p.h. regardless of how wide open the usual throttle is thrown by the automobile operator pressing on the ordinary accelerator.

Figure 2:
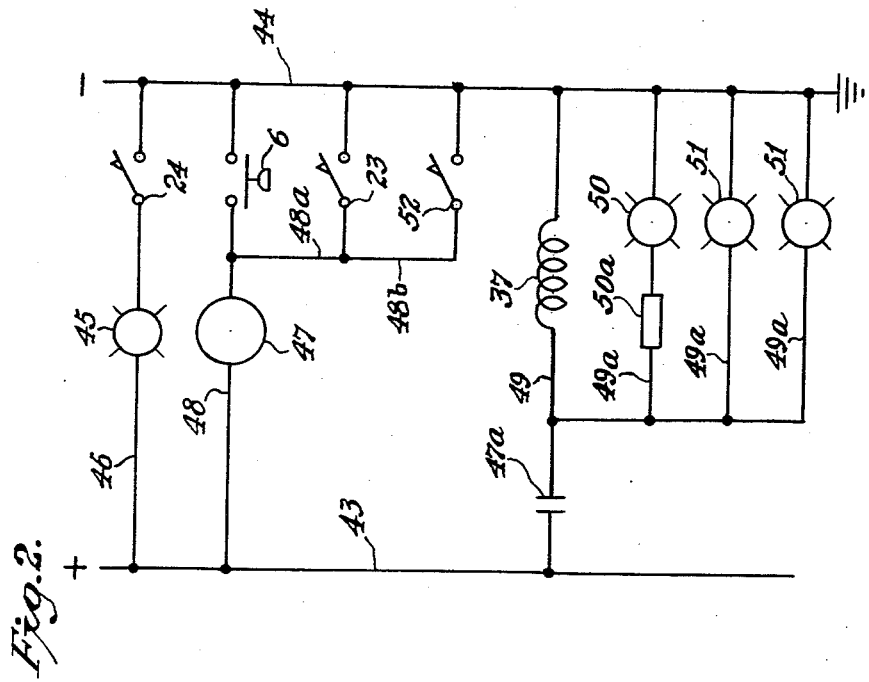
Fig. 2 is a wiring diagram showing the electric circuit used by this system for its control.

Going now to Fig. 2, showing the schematic wiring diagram, the lines 43 and 44 represent, respectively, the ungrounded and grounded electric lines of an automobile which are powered by the usual storage battery which may be, of course, of any voltage. The safety system may be designed to accommodate the voltage used by the electrical system of the make of automobile for which the system is intended. The switch 24 connects a signal 45, such as a light, through a line 46 with the lines 43 and 44. The solenoid 47 of an otherwise unillustrated relay, is connected in circuit with the lines 43 and 44 by a line 48 which includes the pressure actuated switch 6, usually used to operate the stop lights, and through a branch line 48a so as to include the switch 23. The relay, having the solenoid 47, when energized closes contacts 47a which through a line 49 energizes the solenoid 37 of the device shown by Figs. 6 and 7 and through a branch line 49a operates a signal 50, such as a light, and also the usual stop lights 51. It is to be understood that this system may be wired through the usual ignition switch, for example, so as to render the entire system inoperative when the automobile is not in use. Fuses should be used wherever safety indicates their presence to be desirable. A flasher 50a may be inserted in the line 49a to cause the signal 50 to become more conspicuous.

Returning to Fig. 1, it will be noted that a limit switch 52 having an operator 53 is located so that when the brake pedal 4 is pressed almost to its lowermost possible position, such as happens in the event the tubing 5 should open up, for example, an abutment 54 engages this operator 53 so as to actuate the switch 52.

In Fig. 2 this switch 52 is shown as being connected in a branch line 48b so that when this switch 52 is actuated the solenoids of the relay 47 are connected between the lines 43 and 44. The tubing 14a, in Fig. 1, which shunts the master cylinder and includes the check valve 55 causes the liquid in the device of Figs. 3 through 5 to drain out rapidly if the tubing 5 or the brake cylinders fail. When the brakes are applied the check valve 55 prevents the liquid from surging back to the bowl 11. The master cylinder 8 may have a vent opening 56 which is shown connected by tubing 57 with an inlet 58 formed in the top of the bowl 11 above the level of the liquid therein when this bowl is filled with the proper amount of liquid. This is for the purpose of venting the reservoir 8 and, if desired, the branch line 14a may be similarly vented should this prove to be desirable. The bowl 11 is provided with a vent tube 59 which is fastened in a hole 60 formed through the shelf 10, this tube extending up through holes formed through the parts 19 and 21. The hole 29a, formed through the cover 29, is sufficiently larger than the stem portion 18a to provide an annular hole through which air or other gases may finally vent from the system.

The operation of this system, when applied to an automobile, is as follows.

Assuming that the bowl 11 is properly filled with reserve hydraulic liquid the automobile, of course, may be operated in the usual fashion. There is the big difference, however, that whenever the automobile visits a service station, for example, the serviceman notices the conspicuous unit, shown by Figs. 3 through 5, as soon as the automobile hood is opened. Therefore, the serviceman automatically can check the supply of hydraulic liquid just as he does the supply of lubricating oil in the motor, the amount of water in the battery and the like. The serviceman can tell where more hydraulic liquid is needed by observing the height of the stem portion 18a or directly by looking through the bowl 11 when the latter is made from transparent plastic, in which case the bowl may have a mark to show the proper liquid level. The automobile operator has also an equally good opportunity to make the described check in the event that the operator services his own car.

Should the hydraulic liquid in the brake system begin to draw on the supply in the bowl 11 without the bowl 11 being replenished promptly, the float 16 falls so that the switch 24, which is of the normally closed type, is deactivated so that it closes, thus energizing the signal 45. This signal may be an amber or red light, for example, mounted on the instrument panel of the automobile where the operator cannot fail to see the signal. This is a warning that the hydraulic brake liquid supply is getting low but at this time nothing else happens.

If the warning signal is ignored by the operator the float 16 falls farther and actuates the normally open switch 23 which then closes and energizes the solenoid 47. Energization of the solenoid 47 causes energization of the solenoid 37 which promptly throws the throttle valves 36 closed. At the same time, the stop lights 51 are lighted along with the danger signal 50 which may be a red light, for example, also located on the automobile instrument panel and which flashes or operates intermittently. Now the operator cannot possibly drive the automobile very fast, his speed being restricted to, for example, 20 m.p.h. as a maximum. This practically forces the operator to drive the automobile with enforced carefulness to the nearest service station.

The above emergency operation also is effected whenever the switch 52 is actuated by reason of the pedal 4 sinking too close to the floor board when pushed. Such excessive brake pedal travel occurs for various reasons all representing a dangerous condition. For example, the tubing 5 may open somewhere, or the connection between this tubing and the master cylinder may fail.

In any event, the above described emergency action forces the automobile operator to drive carefully and makes him go to the closest service station where he can obtain the necessary repairs.

As soon as any of the foregoing conditions are corrected and the bowl 11 is refilled the entire system returns to its normal condition without any further attention. In other words, the system is normal so long as the bowl 11 is properly filled. The only exception is that the operator or a serviceman may manually press down the stem portion 18a for the purpose of testing the system. Obviously as this stem is forced down slowly the warning signal is first actuated and then the emergency condition is obtained where the separate or auxiliary throttle valve is operated and the danger signal is actuated together with the stop lights. It can be seen that this entire system is almost foolproof.

Referring back to the unit shown by Figs. 6 and 7, it will be noted that no mechanical means are required to locate the throttle valves 36 at their fully opened and fully closed positions. It is to be understood that these valves are never completely closed since they are designed to permit the motor to operate enough to get the vehicle to a repair station. For example, the valves may be made so that they are very slightly smaller in diameter than the conduit sections 31, and they may be provided with a small passage 36a, in each instance.

With the above in mind, it has been discovered that the conventional throttle of an automobile motor tends to stay fully closed because there is a suction on the motor side of the throttle. After the throttle is opened slightly the pressure on both sides of the valve is equalized so that the valve opens the rest of the way very easily. This action is used to advantage with the present invention in that when the solenoid 37 is energized its armature 38 pulls the valves to a generally closed position. As the valves approach this position the suction effect causes them to snap fully closed and maintain themselves in this closed position as long as the motor operates.

There is a corresponding effect tending to hold the valves fully opened and it has been found unnecessary to provide any means for holding the valves in their fully opened positions. The spring 41 generally locates them in their opened positions and performs the additional function of acting as a cushion when the suction snaps the valves shut when they are pulled almost closed by the armature 38.

The suction holding the valves 36 closed is so very great when the usual carburetor throttle valve or valves are wide open as to prevent the spring 41 from opening the valves even though the solenoid 37 may be deenergized. Such action occurs, for example, in case the automobile accelerator is fully depressed. When the accelerator is released the spring 41 is able to open the valves 36. This effect has the advantage that if the operator attempts to apply the brake and his foot slips from the brake to the accelerator the valves 36, having been closed by the momentary depression of the foot pedal remain closed until the accelerator is released. This provides an added safety feature.

I claim:

1. A safety system for a motor vehicle having hydraulic brakes, said system including an extra hydraulic brake liquid tank, an extra safety throttle for controlling the motor's speed and which is independent of the usual throttle, and means for causing said extra throttle to close a predetermined amount automatically in response to a predetermined reduction in the amount of liquid in said tank, and means for also closing said extra throttle a predetermined amount automatically in response to actuation of the vehicle's hydraulic brakes.

2. A safety system for a motor vehicle and including an extra throttle for controlling the motor's speed and which is independent of the usual throttle, said vehicle having a brake actuating device which should not move beyond a predetermined limit for safe operation, and means for closing said extra throttle automatically in response to said device moving beyond said limit.

3. A safety system for a motor vehicle and including a connector conduit unit having means for connecting it between the usual throttle and intake manifold of the vehicle's motor, said unit including its own throttle and remote controlled means for actuating the same, and means connected with the vehicle's brake system for actuating said remote controlled means each time said brake system is activated.

4. A safety system for a motor vehicle having a motor and a hydraulic brake system including a master cylinder and tubing connecting said cylinder with the brakes, said safety system comprising an extra hydraulic brake fluid tank, conduit means connecting said tank to said master cylinder and to said tubing, which connects said master cylinder with the brakes, and including a check valve located so as to prevent hydraulic pressure surging back to said tank and master cylinder from said tubing while permitting fluid to flow from said tank to said tubing, and means for reducing the maximum possible power of said motor automatically in response to a predetermined reduction in the amount of fluid in said tank.

5. A safety system for a motor vehicle having a motor and a hydraulic brake system including a master cylinder and tubing connecting said cylinder with the brakes, said safety system comprising an extra hydraulic brake fluid tank, conduit means connecting said tank to said master cylinder and to said tubing, which connects said master cylinder with the brakes, and including a check valve located so as to prevent hydraulic pressure surging back to said tank and master cylinder from said tubing while permitting fluid to flow from said tank to said tubing, and means for reducing the maximum possible power of said motor automatically in response to a predetermined reduction in the amount of fluid in said tank, and means for also actuating said power reducing means automatically in response to actuation of said hydraulic brake system and independently of the amount of fluid in said tank.

6. A safety system for a motor vehicle having a motor and a hydraulic brake system including a master cylinder and tubing connecting said cylinder with the brakes, said safety system comprising an extra hydraulic brake fluid tank, conduit means connecting said tank to said master cylinder and to said tubing, which connects said master cylinder with the brakes, and including a check valve located so as to prevent hydraulic pressure surging back to said tank and master cylinder from said tubing while permitting fluid to flow from said tank to said tubing, and means for reducing the maximum possible power of said motor automatically in response to a predetermined reduction in the amount of fluid in said tank, said power reducing means comprising a self-contained throttle unit attachable to a standard motor fuel supply system and said tank and conduit means comprising assemblies attachable to a standard motor vehicle and its brake system, whereby said safety system may be assembled as a package for sale.

References Cited in the file of this patent
UNITED STATES PATENTS

| | | |
|---|---|---|
| 1,144,101 | Bradbury | June 22, 1915 |
| 1,496,306 | Duhamel | June 3, 1924 |
| 1,890,790 | Messinger | Dec. 13, 1924 |
| 2,159,405 | Schubert | May 23, 1939 |
| 2,198,247 | Grob | Apr. 23, 1940 |
| 2,297,053 | Florio | Sept. 29, 1942 |
| 2,613,293 | Marks | Oct. 7, 1952 |
| 2,681,959 | Lanyon | June 22, 1954 |
| 2,700,153 | Huckabee | Jan. 18, 1955 |
| 2,706,025 | Halttunen | Apr. 12, 1955 |